United States Patent [19]
Klumpjan

[11] Patent Number: 5,333,808
[45] Date of Patent: Aug. 2, 1994

[54] WIRE UNREELING DEVICE

[76] Inventor: Joe Klumpjan, 1334 Sunset Dr., Rte. 3, Campbellsport, Wis. 53010

[21] Appl. No.: 101,963

[22] Filed: Aug. 4, 1993

Related U.S. Application Data

[62] Division of Ser. No. 46,205, Apr. 12, 1993, abandoned.

[51] Int. Cl.⁵ .............................................. B65H 49/18
[52] U.S. Cl. ................................. 242/598.3; 242/129
[58] Field of Search ............... 242/129, 86.3, 86.4, 242/94, 85

[56] References Cited

U.S. PATENT DOCUMENTS

| | | | |
|---|---|---|---|
| 167,851 | 9/1875 | Miller | 242/86.4 |
| 366,909 | 7/1887 | Wirt | 242/86.4 |
| 589,490 | 9/1897 | Young | 242/94 |
| 594,977 | 12/1897 | Williams | 242/94 |
| 1,648,568 | 11/1927 | Stoffel | 242/94 |
| 2,029,953 | 2/1936 | Sutilef | 242/94 |
| 2,140,676 | 12/1938 | Hohner | 242/94 |
| 3,820,733 | 6/1974 | Roederer | 242/94 |

FOREIGN PATENT DOCUMENTS

| | | | |
|---|---|---|---|
| 268137 | 3/1927 | United Kingdom | 242/86.4 |
| 494914 | 11/1938 | United Kingdom | 242/86.4 |
| 895715 | 5/1962 | United Kingdom | 242/85 |

*Primary Examiner*—Stanley N. Gilreath
*Attorney, Agent, or Firm*—Andrus, Sceales, Starke & Sawall

[57] ABSTRACT

A manual unreeling device for a spool of wire is adapted to be pulled over the surface of the ground in a first position in which the rims of the spool act as wheels for rolling support of the device and an inverted second position where a pair of integral skids supports the device for sliding movement over the ground and holds the spool above and out of contact with the ground surface. The first position allows better control of the payout of the wire from the spool and the second inverted position is utilized when skidding of the rims on the ground because of the increasing differential between rim diameter and remaining wire coil diameter inhibits effective operation.

1 Claim, 1 Drawing Sheet

WIRE UNREELING DEVICE

This is a division of application Ser. No. 08/046,205, filed Apr. 12, 1993, now abandoned.

BACKGROUND OF THE INVENTION

The present invention pertains to wire unreeling device and, more particularly, to manual wire unreeling devices which carry a spool of wire and are pulled over the ground allowing the wire to be played out from the spool.

Wire unreeling devices of the general type described above are well known in the art. When laying a string of wire from a spool, such as barbed wire for a fence line, the ground surface which must be traversed is often rough and uneven and the barbed wire itself is often difficult to handle because of its inherently hazardous nature and tendency to uncoil or backlash. Prior art devices which are intended to overcome the foregoing difficulties tend to become mechanically complex and somewhat unwieldly and difficult to manipulate.

SUMMARY OF THE INVENTION

In accordance with the present invention, a wire unreeling device supports a spool of wire in one position to utilize the rims of the spool as wheels and in an inverted position to hold the spool above the ground in a freewheeling manner. The device of the present invention is intended to utilize a conventional rimmed spool having a hollow hub, and the device includes a rigid frame which has a main frame portion including an upper end comprising a handle and allowing the frame to be pulled manually over the surface of the ground. The opposite end of the frame is provided with a demountable cross shaft which extends through the spool of the hub to rotatably attach the spool to the frame. The frame also includes a ground-engaging support adjacent the cross shaft and extending laterally away from one side of the main frame portion in a direction generally perpendicular to the cross shaft. The rims of the spool engage the ground and rotatably support the frame when it is pulled over the ground with the side of the frame including the ground engaging support facing generally upwardly away from the ground. When the frame is inverted, the spool is held above the ground by the ground engaging support.

The main frame portion is preferably of a generally U-shaped construction with the bottom of the U comprising a handle and the ground engaging support comprising a pair of integral extensions of the legs of the U. The extensions preferably comprise a pair of curved skids.

DETAILED DESCRIPTION OF THE PREFERRED EMBODIMENT

Figure 1:
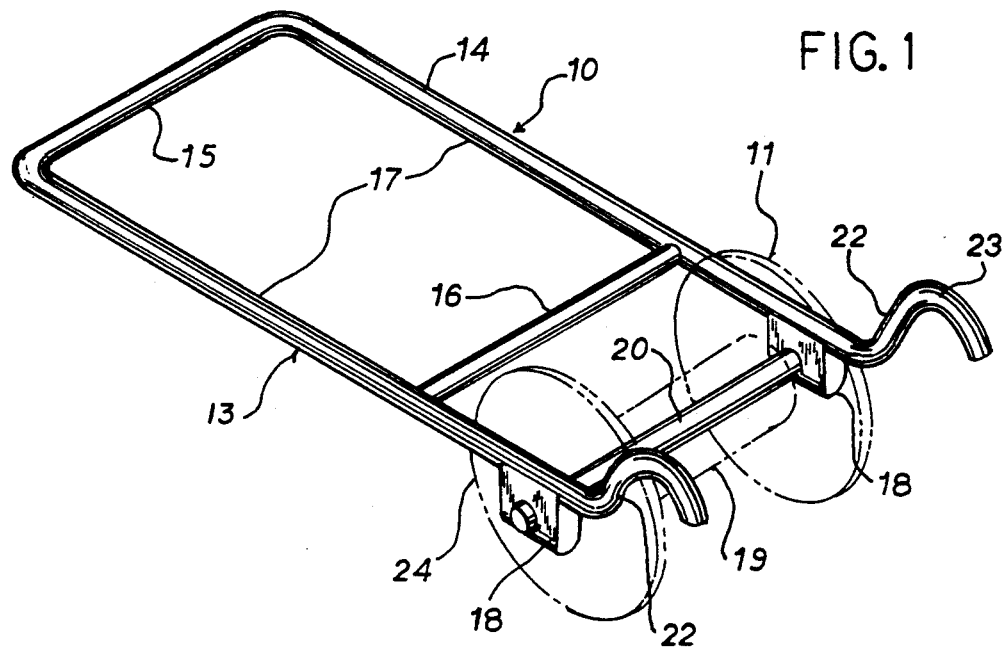
FIG. 1 is a perspective view of the wire unreeling device of the present invention showing a spool attached thereto.

A wire unreeling device 10 carries a conventional spool 11 of wire, such as barbed wire 12, and is intended to be pulled over the surface of the ground to allow the wire to be played out from the spool, as when laying a fence line. The device includes a rigid frame 13 which includes a generally U-shaped main frame portion 14. The bottom of the U-shaped frame portion 14 provides a handle 15 for pulling the device over the ground. A reinforcing bar 16 extends between the legs 17 of the U-shaped main frame portion 14 spaced from and generally parallel to the handle 15. Nearer the ends of the legs 17 are attached a pair of bearing blocks 18 which are positioned to receive the ends of and support a cross shaft 20. The shaft 20 may be held in the bearings blocks 18 by any convenient means, such as cotter pins 21 extending through the ends of the shaft outside the bearing blocks. By removing one cotter pin and moving the shaft axially, the spool 11 of wire can be rotatably mounted on the shaft by inserting the shaft through the hollow hub 19 of the spool.

The ends of the frame legs 17 are also provided with integral curved extensions 22 which extend laterally away from the plane of one side of the frame 13 and are disposed generally perpendicular to the cross shaft 20. The extensions 22 provide support for the device in one position of use and include curved ends 23 which operate as supporting skids in that position.

Figure 2:
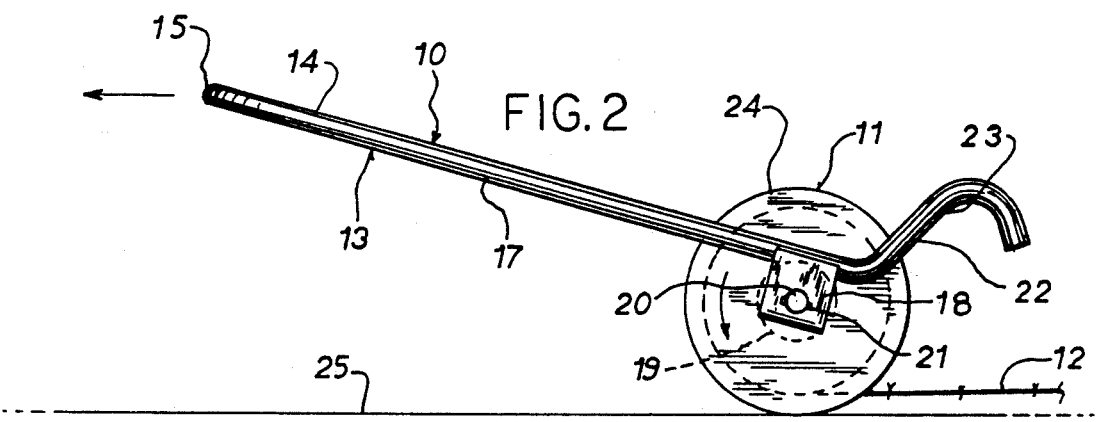
FIG. 2 is a side elevation of the unreeling device shown in FIG. 1 in one position of operation.

Referring first to FIG. 2, the device is shown in a first and preferably initial position of use, when a new full spool 11 of wire 12 is mounted on the frame 13. In this position, the end of the wire is secured and the handle 15 may be grasped by the user and the device pulled in the direction indicated by the horizontal arrow, allowing the rims 24 of the spool to act as wheels, rotating in the direction indicated by the curved arrow to allow the wire 12 to played out from the spool and laid over the surface of the ground 25. As the wire is removed from the spool, the effective diameter of the remaining coil of wire wound on the spool hub grows smaller. The result is that a continually smaller length of coiled wire is available to payout with each revolution of the rims 24, such that the rims will begin to overrun and skid as the device is pulled over the ground.

The rims of the spool will continue to turn less freely, whereupon the user may simply invert the device by turning it over so that it is supported on the curved ends 23 of the support extensions 22. The user may continue to pull the device over the ground in the indicated direction and the wire 12 is free to unwind from the spool 11 in direct response to forward movement of the frame 13. The curved ends 22 act as simple skids allowing the device to be pulled easily over the surface of the ground 25, including substantially uneven or rough ground.

Figure 3:
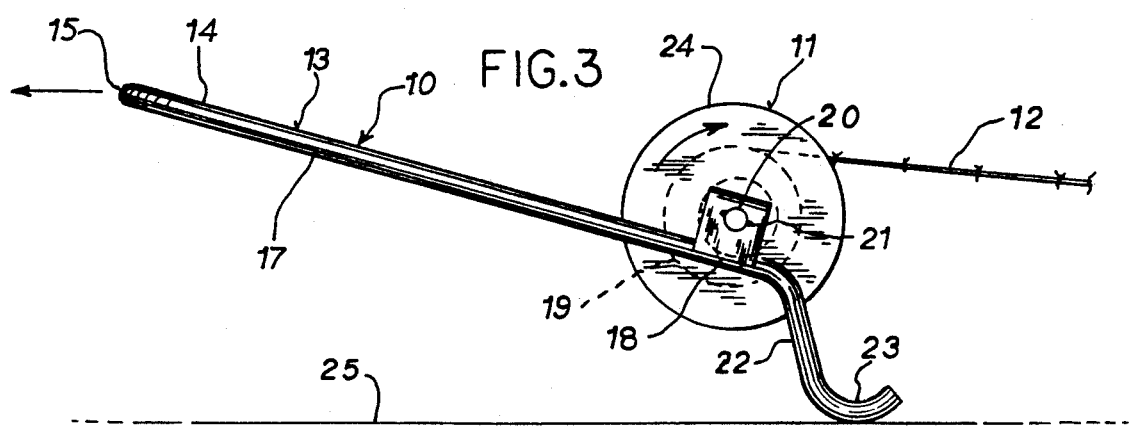
FIG. 3 is a side elevation of the unreeling device operating in a position inverted from the FIG. 2 position.

In the inverted position of FIG. 3, care must be taken that the unrestricted rotation of the spool 11 does not result in uncoiling of the wire due to its inherent springiness which might result in a backlash or the wire leaving the confines of the rims 24. However, as the effective diameter of the coiled wire remaining on the spool grows smaller, these problems tend to diminish somewhat.

Various modes of carrying out the present invention are contemplated as being within the scope of the following claims particularly pointing out and distinctly claiming the subject matter which is regarded as the invention.

I claim:

1. A method for laying over the surface of the ground wire wound on a rimmed spool with a hollow hub comprising the steps of:
   (1) providing a rigid frame having a main frame portion including an upper end having a handle to allow the frame to be grasped and a lower end having demountable shaft means extending into the spool hub for rotatable attachment of said spool to the frame;
   (2) providing said rigid frame with a ground-engaging support adjacent the cross shaft and extending laterally away from one side of the main frame portion beyond the rims of the spool;
   (3) supporting the frame above the surface of the ground on the rims of the spool with said one side of the main frame portion facing generally upwardly;
   (4) securing an end of the wire;
   (5) pulling the device by the handle to cause the rims of the spool to roll over the surface of the ground and to cause a selected initial amount of the wire to be unwound from the spool and laid on the ground surface;
   (6) inverting the device to place the ground-engaging support in contact with the surface of the ground and to support the spool above the surface of the ground; and,
   (7) pulling the inverted device by the handle to cause the ground-engaging support to slide over the surface of the ground and to cause a selected additional amount of wire to be unwound from the spool and laid on the ground surface.

* * * * *